(12) United States Patent
Bell

(10) Patent No.: US 9,792,691 B2
(45) Date of Patent: Oct. 17, 2017

(54) INTER-TIDAL MAPPING

(71) Applicant: Natural Environment Research Council, Wiltshire (GB)

(72) Inventor: Paul Bell, Liverpool (GB)

(73) Assignee: Natural Environment Research Council, Swindon, Wiltshire (GB)

( * ) Notice: Subject to any disclaimer, the term of this patent is extended or adjusted under 35 U.S.C. 154(b) by 0 days.

(21) Appl. No.: 14/786,342

(22) PCT Filed: Mar. 24, 2014

(86) PCT No.: PCT/GB2014/050908
§ 371 (c)(1),
(2) Date: Oct. 22, 2015

(87) PCT Pub. No.: WO2014/174240
PCT Pub. Date: Oct. 30, 2014

(65) Prior Publication Data
US 2016/0078629 A1   Mar. 17, 2016

(30) Foreign Application Priority Data
Apr. 23, 2013   (GB) .................................. 1307303.6

(51) Int. Cl.
*G06K 9/00* (2006.01)
*G06T 7/00* (2017.01)
*G01C 5/00* (2006.01)
*G01S 17/89* (2006.01)
*G06T 7/579* (2017.01)

(52) U.S. Cl.
CPC .............. *G06T 7/0071* (2013.01); *G01C 5/00* (2013.01); *G01S 17/89* (2013.01); *G06T 7/579* (2017.01); *G06T 2207/10016* (2013.01); *G06T 2207/10024* (2013.01); *G06T 2207/10044* (2013.01); *G06T 2207/30181* (2013.01)

(58) Field of Classification Search
None
See application file for complete search history.

(56) References Cited

U.S. PATENT DOCUMENTS

2012/0101795 A1* 4/2012 Blain .................. G06F 17/5018
703/9

OTHER PUBLICATIONS

Chen et al "Detection of shoreline changes for tideland areas using multi-temporal satellite images", int. j. remote sensing, 1998, vol. 19, No. 17, 3383±3397.*
Aarninkhof et al "A video-based technique for mapping intertidal beach bathymetry", The NetherlandsbWater Research Laboratory, School of Civil and Environmental Engineering, University of New South Wales, Sydney, Australia c Delft University of Technology, Faculty of Civil Engineering and Geoscien, Received Feb. 28, 2002.*

(Continued)

*Primary Examiner* — Shervin Nakhjavan
(74) *Attorney, Agent, or Firm* — Foley & Lardner LLP

(57) ABSTRACT

A method of mapping an inter-tidal area, comprising: obtaining, over a period of time, image data comprising: a sequence of images of the inter-tidal area at a range of different stages of the tide, and the time at which each image was obtained; determining an elevation of a location in the image, by correlating the changes in an image value over time at the location with tidal data comprising the elevation of the tide over the period of time.

19 Claims, 4 Drawing Sheets

(56) References Cited

OTHER PUBLICATIONS

Search Report from United Kingdom Intellectual Property Office for British patent Application No. GB1307303.6, issued Oct. 24, 2013, 4 pages.

Plant, N.G., et al. "Intertidal Beach Profile Estimation Using Video Images," Marine Geology 140 (1997), pp. 1-24.

Uunk, L. et al. "Automated Mapping of the Intertidal Beach Bathymetry From Video Images," Coastal Engineering 57 (2010), pp. 461-469.

Gaudin, D. et al. "High Resolution DEM Derived from Thermal Infrared Images: Example of Aber Benoit (France)", International Geoscience and Remote Sensing Symposium, (IGARSS), 2009, IEEE, IV-705-IV-708.

Mason, D. C., et al. "Accurate and Efficient Determination of Shoreline in ERS-1 SAR Images," IEEE Transactions on Geoscience and Remote Sensing, vol. 34, No. 5, Sep. 1996, pp. 1243-1253.

Zhao, B. et al., "A Simple Waterline Approach for Tidelands Using Multi-Temporal Satellite Images: A Case Study in the Yangtze Delta," Estuarine, Coastal and Shelf Science, vol. 77, 2008 (New York), pp. 134-142.

Zhen Li, et al. "Topographical Mapping of Wadden Sea with SAR Images and Water Level Model Data," International Geoscience and Remote Sensing Symposium (IGARSS), 2012, IEEE, pp. 2645-2648, Institute of Environmental Physics, University of Bremen, Germany.

International Search Report and Written Opinion for PCT/GB2014/050908, issued Jul. 18, 2014, 12 pages.

Thornton, E. B. "The Evaluation of Large-Scale (km) Intertidal Beach Morphology on Macrotidal Beach Using Video Images," Coastal Dynamics—Proceedings of the International Conference, Jun. 1, 1997, 385-394.

Ligang Cheng et al. "Reconstruction of Tide Flat Topography Evolution Based on Optic Flow Method," Multimedia Technology (ICMT), 2011, International Conference on, IEEE, Jul. 26, 2011, pp. 5468-5471.

\* cited by examiner

INTER-TIDAL MAPPING

CROSS-REFERENCE TO RELATED APPLICATIONS

The present application is a U.S. national stage application claiming the benefit of International Application No. PCT/GB2014/050908, filed on Mar. 24, 2014, which claims priority from Great Britain Patent Application No. 1307303.6, filed Apr. 23, 2013, the entire contents of which are incorporated herein by reference in their entirety.

The present invention relates to a method and apparatus for mapping inter-tidal areas, and more specifically to a method and apparatus for determining the elevation of at least one location of an inter-tidal area.

It is known to map the contours of inter-tidal areas by using the waterline. The height of the waterline can be determined, based on tide measurements, tables or simulations, and the waterline can be used as a proxy for a height contour. The location of the waterline indicates that the land at the waterline is at an elevation corresponding with the current height of the waterline (which can be determined with reference to a tide measurement, table or simulation).

Although this technique may work some of the time, it can be extremely difficult to identify the position of the waterline. This task is difficult, even by eye, and is extremely difficult to automate. Techniques are known based on edge detection in an image of the intertidal area, for example using wavelet methods, but these are relatively unreliable and prone to error.

It is among the objectives of the present invention to overcome or at least ameliorate at least sonic of these problems.

According to a first aspect of the invention, there is provided a method of mapping an inter-tidal area, comprising:

obtaining, over a period of time, image data comprising a sequence of images of the inter-tidal area at a range of different stages of the tide;

determining an elevation of at least one location in the image, by correlating the changes in an image value over time at the location with tidal data comprising the elevation of the tide over the period of time.

Determining the elevation may comprise determining a measure of change with respect to time for the location.

The tidal data may comprise the transitions, over the period of time, between wet and dry at each of a plurality of elevations. Alternatively, the method may comprise calculating from the tidal data, the transitions, over the period of time, between wet and dry at each of a plurality of elevations.

The elevation may be determined based on a similarity between the measure of change at the location and the transitions at each elevation.

Determining an elevation for the location may comprise determining a distribution of the measure of similarity with respect to the plurality of elevations, and selecting an elevation that corresponds with a maximum measure of similarity.

The location in the image may be a pixel, or a plurality of adjacent pixels.

The measure of change may correspond with the square of the gradient of an image value with respect to time for each location. The measure of change may correspond with the absolute value of the change in an image value between consecutive images of the sequence. The image value may correspond with an alpha value of a location in the image. The image value may comprise at least one of a Red Green or Blue value of a pixel associated with the location.

The method may further comprise identifying whether the location stays wet or dry over the period of time. A location may be identified as staying dry over the period of time if the change in the images at the location over the period of time is below a threshold level. A location may be identified as staying wet over the period of time if changes in the image have too high a frequency. Identifying whether a location stays wet or dry may comprise, carrying out a Fourier transform on the time sequence of image values at the location. Locations which lack a large spectral component at the tidal frequency are more likely to be locations that stay wet or stay dry. Conversely, locations with a large spectral component at the tidal frequency are likely to be inter-tidal locations. Locations may be identified as staying wet or staying dry based on detecting an edge of an inter-tidal region. Locations may be identified as staying wet based on a spatial filtering of an elevation map produced according to an embodiment of the invention, that identifies locations with a high spatial frequency of change in elevation as staying wet. Discontinuities or a high rate of change of elevation may be used to indicate a location that stays wet over the period.

The tidal data may comprise a record that indicates, for each of a series of elevations, at each of the times at which the sequence of images was recorded, whether the elevation is wet or dry at the time.

The method may comprise curve fitting to provide continuous functions that are representative of at least one of: an image value with respect to time, the measure of change with respect to time, and/or the measure of similarity with respect to elevation. The method may comprise interpolation of the measure of change and/or the measure of similarity.

The tidal data may comprise a tidal elevation record. The tidal data may comprise a tide table.

The images may comprise radar images, infra-red images, hyper-spectral images, and/or visible light images. Radar images may comprise, for instance, marine X-band radar images. The images may comprise image frames of a video.

The sequence of images may be collected at regular time intervals. The time intervals may be between 15 minutes and 3 hours, preferably 1 hour.

The period of time may be at least one tidal period (of high to low tide). The period of time may correspond to a spring-neap tidal cycle (of two weeks). The period of time may comprise a plurality of tidal periods. The period of time may be a year or more. It will be appreciated that for periods with more than one tidal period, an average shape of the inter-tidal area over the tidal periods may be produced.

The sequence of images may comprise satellite imagery, or imagery obtained from an aerial position, for instance from an aircraft, unmanned aerial vehicle (UAV), or balloon. Alternatively or additionally, imagery may be obtained from an elevated position, e.g. from a building or a structure such as a tower, a crane or a mast.

According to a second aspect of the invention, there is provided an apparatus for carrying out the method according to the first aspect, comprising:

a computer, configured to process a sequence of images recorded on a data storage device to:
create a measure of change with respect to time for image location,
determine an elevation for the location, based on a similarity between the measure of change at each location and the transitions from wet to dry at each elevation recorded in tidal data.

The apparatus may further comprise an imaging device for recording the sequence of images of the intertidal area to the data storage device.

The computer may be configured to perform the method according to the first aspect of the invention.

The imaging device may comprise a radar, for example an X-band marine radar. The imaging device may be a satellite, or air vehicle. The images may comprise at least one of visible light images, infra-red images, radar images, hyperspectral images.

The tidal data may comprise a tidal elevation record.

According to a third aspect of the invention, there is provided a computer readable medium comprising software that, when loaded on a suitable computer, configures the computer to process a sequence of images recorded on a data storage device to:
- create a measure of change with respect to time for an image location,
- determine an elevation for the location, based on a similarity between the measure of change at the location and the transitions from wet to dry at each elevation recorded in tidal data.

The software may configure the computer to perform the method according to the first aspect of the invention.

The invention will now be described, purely by way of example, with reference to the accompanying drawings, in which.

Figure 1:
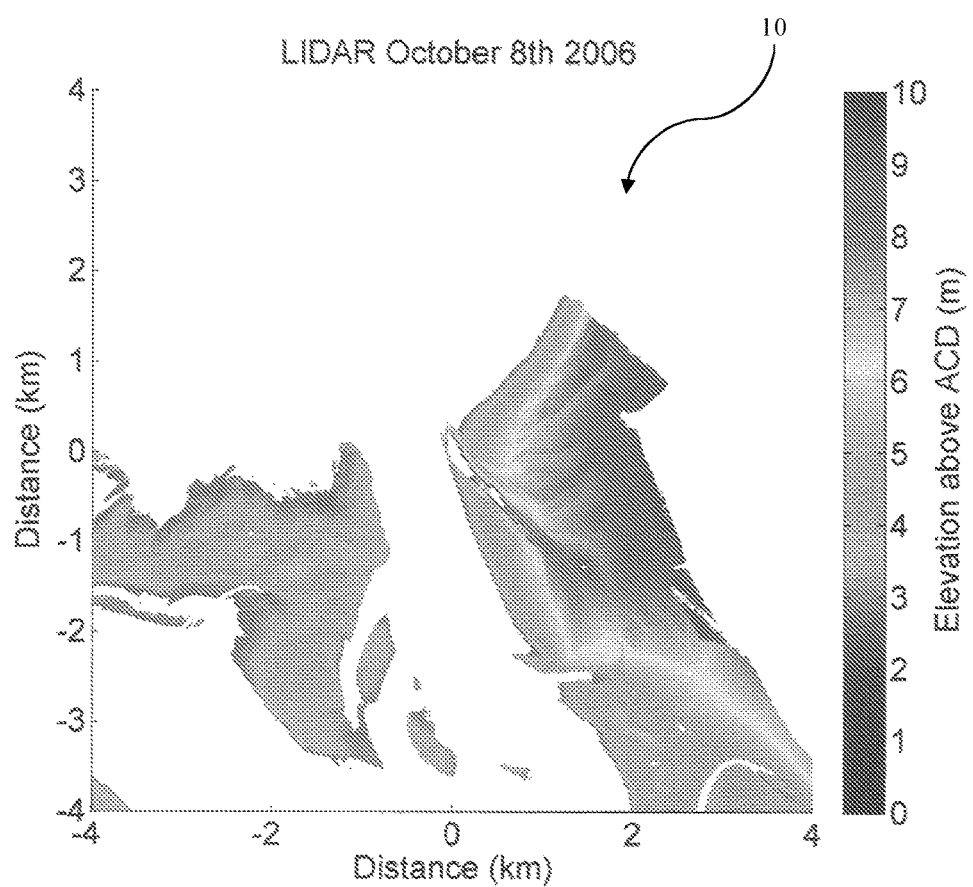
FIG. 1 is an elevation map of an inter-tidal area obtained using light detection and ranging (LIDAR)

Referring to FIG. 1, a LIDAR elevation map 10 of the intertidal region of the Dee Estuary of Liverpool Bay is shown. The LIDAR elevation map 10 was recorded on Oct. 8, 2006, and records the elevation of the intertidal regions above the Admiralty Chart Datum (ACD), which corresponds with the lowest astronomical tide. The LIDAR map covers an area of approximately 64 square kilometers (being a square area, with 8 km edge length).

The LIDAR elevation map 10 is used to assess the accuracy of the initial mapping technique. A high degree of agreement between the LIDAR elevation map 10 and an elevation map produced according to an embodiment of the invention indicates that the invention is promising.

Figure 2:
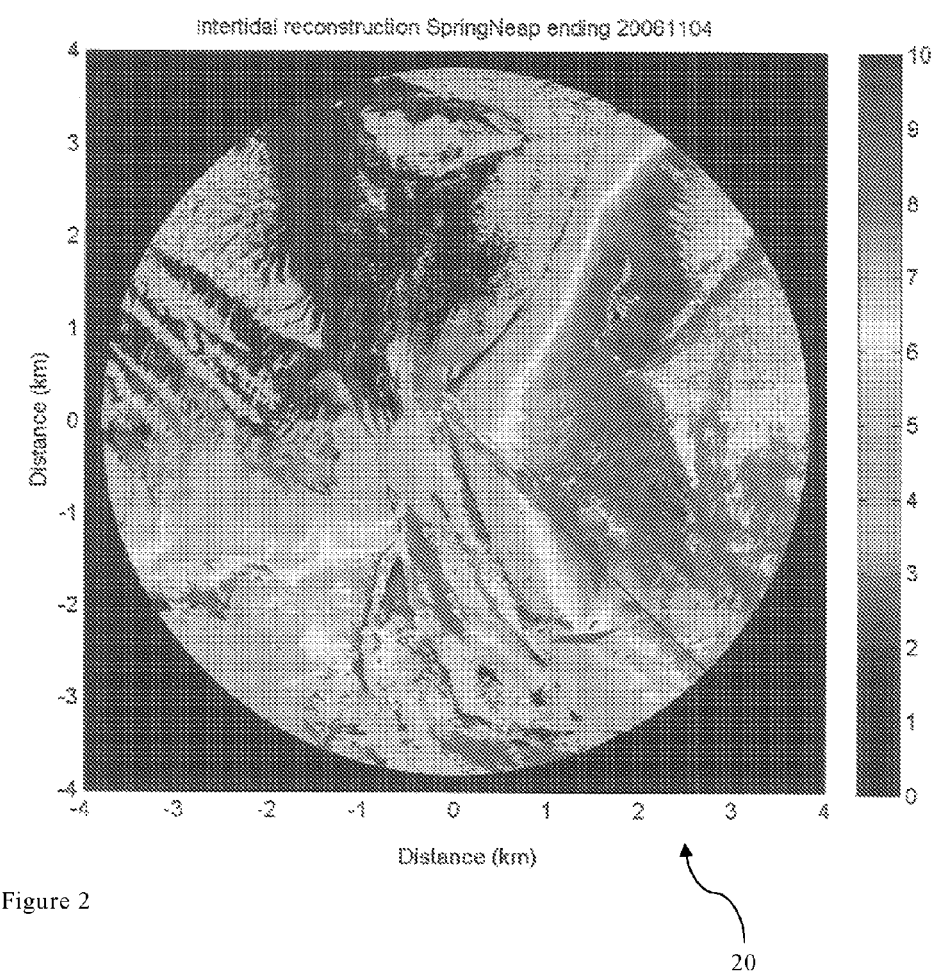
FIG. 2 is an elevation map produced according to an embodiment of the invention, based on a sequence of X-band marine radar images obtained over a single spring-neap tidal period.

FIG. 2 shows an elevation map 20 produced according to an embodiment of the invention. The area covered by the elevation map 20 is centred on the same location as the LIDAR elevation map 10, and comprises a circular elevation map with a radius of 4 km. The elevation map 20 was produced using data recorded by a marine X-band radar, located on a tower in the Dee Estuary in Liverpool Bay. The image data comprised a sequence of radar images obtained over a time period corresponding with the spring-neap tidal cycle, ending Nov. 4, 2006, with images being obtained once per hour. The time associated with recording each image was recorded. The field of each image remained static, so that each pixel location in the series of images corresponds with the same physical location throughout the sequence.

A tidal elevation record was obtained for the Dee Estuary over the time period (i.e. the spring-neap tidal cycle ending Nov. 4, 2006), recording the water height above the ACD over the time period. The tidal range was identified from the tidal record, and a set of elevations generated covering the full tidal range, with intervals of 5 cm in elevation. The tidal record was used to calculate whether each elevation of the set of elevations was wet or dry at each time associated with an image. A binary signal corresponding to wet/dry for each elevation over time was thereby produced.

From the binary signal corresponding to wet/dry for each elevation, a further binary signal recording the transitions between wet and dry (i.e. transition/no transition) with respect to time was created. A time series of transitions for each elevation was thereby created.

From the sequence of images, a measure of change with respect to time for each image pixel was created. The measure of change conveniently comprises the square of the gradient of the time series of image values at each pixel location. An examination of the time series of the measure of change for each pixel location of the inter-tidal area should show a pulse corresponding with each change from wet to dry and vice versa.

For each pixel location, a measure of similarity was calculated between each time series of transitions (generated from the tidal data) and the time series of the measure of change for the pixel location. The measure of similarity is conveniently calculated based on the correlation between the two time series (i.e. the transition time series and the change time series). The result is a distribution of the measure of similarity between each elevation and the image (or pixel) location. The most similar elevation corresponds with the elevation of the pixel location. It will be appreciated that a curve may be fitted to the similarity distribution, and a more accurate elevation determined with reference to the curve.

The map of FIG. 2 was created using an initial embodiment of the invention which had not been optimised. For example, the elevation map 20 was produced without using any method for identifying locations that stay wet or dry. Notwithstanding this a very promising degree of correlation between the elevation map 10 and the elevation map 20 is apparent in the inter-tidal regions thereof.

Figure 3:
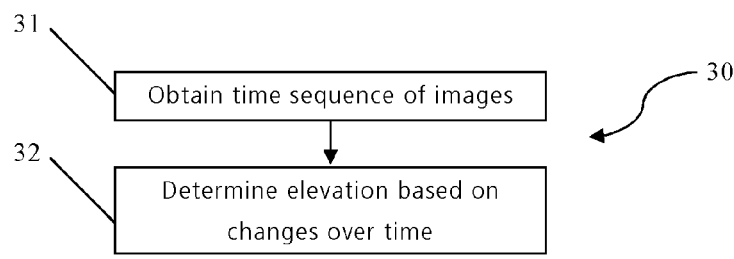
FIG. 3 is a schematic flow diagram of a method according to an embodiment of the invention.

Referring to FIG. 3, a method 30 according to an embodiment is shown. The method comprises obtaining a time sequence of images 31, and subsequently determining elevation based on changes in the sequence of images over time 32.

Figure 4:
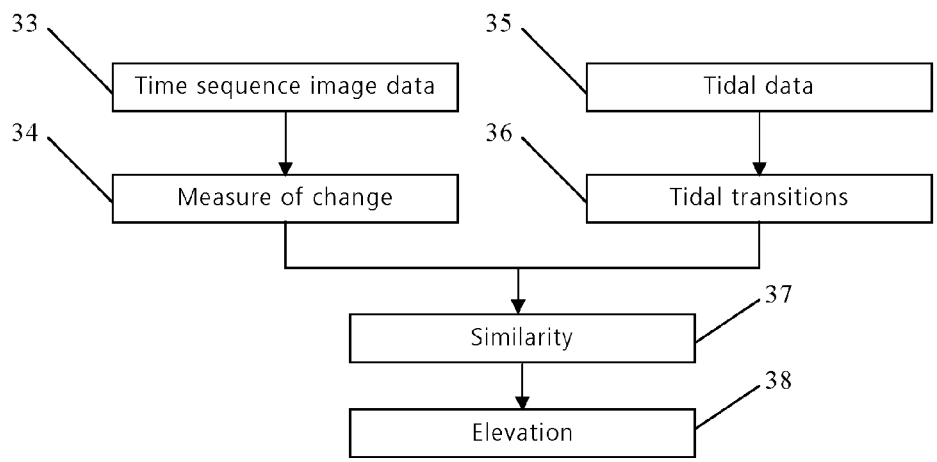
FIG. 4 is a schematic flow diagram of a method according to another embodiment of the invention.

Referring to FIG. 4, a method 40 according to an alternative embodiment is shown, comprising the steps of:
- obtaining a time sequence of image data 33;
- subsequently determining a measure of change for a location of the image data 34;
- obtaining tidal data 35;
- determining for each of a plurality of elevations, a time sequence of tidal transitions 36;
- determining a similarity between the measure of change and the tidal transitions of each elevation 37;
- selecting the most similar elevation as the elevation of the location 38.

Figure 5:
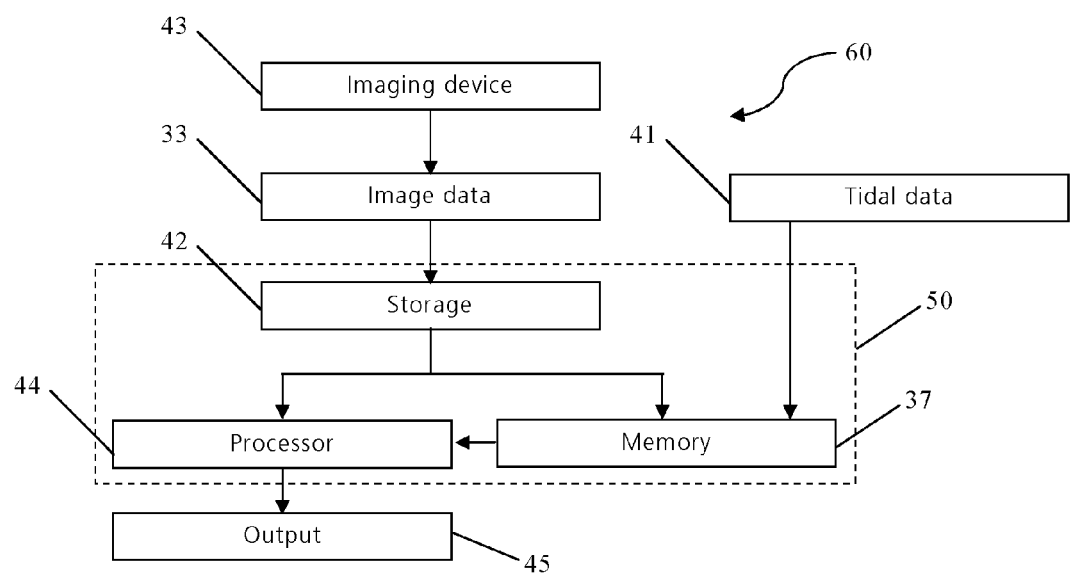
FIG. 5 is a schematic diagram of an apparatus according to an embodiment of the invention.

Referring to FIG. 5, a schematic diagram of an apparatus 60 according to an embodiment of the invention is shown, comprising a computer 50, and an imaging device 43. The computer 50 comprises data storage 42, processor 44 and memory 37. The computer 50 is provided with tidal data 41, and image data 33 which is stored on the data storage 42. The image data 33 originates from the imaging device 43. The processor 44 is configured to create an output 45, which comprises a measure of change with respect to time for an image location, and which determines an elevation for the location, based on a similarity between the measure of change at the location and the transitions from wet to dry at each elevation recorded in the tidal data 41.

A method and apparatus has been disclosed which is suitable for automatically mapping intertidal areas, based on time sequences of images. The invention overcomes a considerable limitation of prior art waterline based methods of mapping of intertidal regions, by recognising that the change from land to water in successive images of a sequence is more straightforward to identify (and to automate the identification of) than finding the precise location of a waterline in a single image. An unlimited number of images can be used by the method of the present invention, and the statistical quality of the resulting elevation map will be improved by increasing amounts of data.

Although the example embodiment has used radar image data, it will be appreciated that infra-red, hyperspectral and visible images could equally be used in the method. For colour images, the image value at each pixel may include a red, green and blue value, which may be used separately or in combination to provide more than one measure of change for each pixel, or a measure of change that better corresponds with a transition between wet and dry (for example based on a weighted signal with blue more heavily weighted than green or red). The image value at each pixel location may comprise polarisation, which may improve the correspondence between the measure of change and the transition between wet and dry. The sequence of images may comprise frames in a video.

The skilled person will appreciate that a number of other modifications are possible, within the scope of the invention, as defined by the appended claims.

The invention claimed is:

1. A method of mapping an inter-tidal area, comprising:
obtaining, over a period of time, image data comprising:
a sequence of images of the inter-tidal area at a range of different stages of the tide, and the time at which each image was obtained;
determining an elevation of a location in each image, by correlating the changes in an image value over time at the location with tidal data comprising the elevation of the tide over the period of time, wherein the tidal data comprises the transitions, over the period of time, between wet and dry at each of a plurality of elevations;
wherein determining the elevation comprises determining a measure of change with respect to time for the location, wherein the measure of change corresponds with the square of the gradient of the image value with respect to time for the location.

2. The method of claim 1, wherein the elevation is determined based on a similarity between the measure of change at the location and the transitions at each elevation.

3. The method of claim 2, further comprising determining a distribution of a measure of similarity with respect to the plurality of elevations, and selecting an elevation for the location that corresponds with a maximum measure of similarity.

4. The method of claim 1, further comprising curve fitting to provide continuous functions that are representative of at least one of: an image value with respect to time, the measure of change with respect to time, and the measure of similarity with respect to elevation.

5. The method of claim 1, wherein the tidal data comprises a tidal elevation record.

6. The method of claim 1, wherein the sequence of images comprise at least one of: radar images, infra-red images, hyper-spectral images, and visible light images.

7. The method of claim 1, wherein the location in each image comprises a pixel or a plurality of adjacent pixels.

8. The method of claim 1, wherein the image value corresponds with an alpha value, a red value, a green value and/or a blue value of a location in the image.

9. The method of claim 1, wherein the sequence of images is collected at regular time intervals.

10. The method of claim 9, wherein the time intervals are between 15 minutes and 3 hours.

11. The method of claim 1, wherein the period of time is at least one diurnal tidal period.

12. The method of claim 1, wherein the period of time corresponds with at least one fortnightly (MO tidal period.

13. An apparatus for mapping an inter-tidal area, comprising:
a computer, configured to process a sequence of images of the inter-tidal area, obtained over a period of time at a range of different stages of the tide and a time at which each image was obtained, recorded on a data storage device so as to:
create a measure of change with respect to time for an image location,
determine an elevation for the location, based on a similarity between the measure of change at the location and the transitions from wet to dry at each elevation recorded in tidal data, wherein the tidal data comprises transitions with respect to time between wet and dry at each elevation;
wherein determining the elevation comprises determining a measure of change with respect to time for the location, wherein the measure of change corresponds with the square of the gradient of the image value with respect to time for the location.

14. The apparatus of claim 13, further comprising an imaging device for recording the sequence of images of the intertidal area to the data storage device.

15. The apparatus of claim 14, wherein the imaging device comprises a radar.

16. A non-transitory computer-readable medium comprising software for mapping an inter-tidal area that, when loaded on a suitable computer, configures the computer to process a sequence of images of the inter-tidal area, obtained over a period of time at a range of different stages of the tide and a time at which each image was obtained, recorded on a data storage device so as to:
create a measure of change with respect to time for an image location, and
determine an elevation for the location, based on a similarity between the measure of change at each location and the transitions from wet to dry at each elevation recorded in tidal data, wherein the tidal data comprises transitions with respect to time between wet and dry at each elevation,
wherein determining the elevation comprises determining a measure of change with respect to time for the location, wherein the measure of change corresponds with the square of the gradient of the image value with respect to time for the location.

17. A method of mapping an inter-tidal area, comprising:
obtaining, over a period of time, image data comprising:
a sequence of images of the inter-tidal area at a range of different stages of the tide, and the time at which each image was obtained;

determining an elevation of a location in the image, by correlating the changes in an image value over time at the location with tidal data comprising the elevation of the tide over the period of time, wherein the tidal data comprises the transitions, over the period of time, between wet and dry at each of a plurality of elevations;

identifying whether the location stays wet or dry over the period of time;

wherein at least one of the following applies:

(a) the method further comprises determining a measure of change with respect to time for the location, and identifying the location as staying dry over the period of time by determining that the measure of change at the location, over the period of time, is below a threshold level;

(b) the method further comprises determining a measure of change with respect to time for the at least one location, and identifying a location as staying wet over the period of time by determining that the frequency of changes in the image are above a threshold frequency; or (c) determining the elevation comprises determining a measure of change with respect to time for the location, wherein the elevation is determined based on a similarity between the measure of change at the location and the transitions at each elevation, and wherein the location is determined as staying wet or dry when the similarity between the measure of change and the transitions for each and every elevation is below a threshold level.

18. An apparatus for mapping an inter-tidal area, comprising:

a computer, configured to process a sequence of images of the inter-tidal area, obtained over a period of time at a range of different stages of the tide and a time at which each image was obtained, recorded on a data storage device so as to:

create a measure of change with respect to time for an image location, determine an elevation for the location, based on a similarity between the measure of change at the location and the transitions from wet to dry at each elevation recorded in tidal data, wherein the tidal data comprises transitions with respect to time between wet and dry at each elevation, identify whether the location stays wet or dry over the period of time;

and at least one of:

determine a measure of change with respect to time for the location, and identify the location as staying dry over the period of time by determining that the measure of change at the location, over the period of time, is below a threshold level;

determine a measure of change with respect to time for the at least one location, and identify a location as staying wet over the period of time by determining that the frequency of changes in the image are above a threshold frequency; or in determining the elevation, determine a measure of change with respect to time for the location, wherein the elevation is determined based on a similarity between the measure of change at the location and the transitions at each elevation, and wherein the location is determined as staying wet or dry when the similarity between the measure of change and the transitions for each and every elevation is below a threshold level.

19. A non-transitory computer readable medium comprising software for mapping an inter-tidal area that, when loaded on a suitable computer, configures the computer to process a sequence of images of the inter-tidal area, obtained over a period of time at a range of different stages of the tide and a time at which each image was obtained, recorded on a data storage device so as to:

create a measure of change with respect to time for an image location, and determine an elevation for the location, based on a similarity between the measure of change at each location and the transitions from wet to dry at each elevation recorded in tidal data, wherein the tidal data comprises transitions with respect to time between wet and dry at each elevation;

identify whether the location stays wet or dry over the period of time;

and at least one of:

determine a measure of change with respect to time for the location, and identify the location as staying dry over the period of time by determining that the measure of change at the location, over the period of time, is below a threshold level;

determine a measure of change with respect to time for the at least one location, and identify a location as staying wet over the period of time by determining that the frequency of changes in the image are above a threshold frequency; or in determining the elevation, determine a measure of change with respect to time for the location, wherein the elevation is determined based on a similarity between the measure of change at the location and the transitions at each elevation, and wherein the location is determined as staying wet or dry when the similarity between the measure of change and the transitions for each and every elevation is below a threshold level.

* * * * *